(12) United States Patent
Kawakami

(10) Patent No.: US 7,665,383 B2
(45) Date of Patent: Feb. 23, 2010

(54) BICYCLE SHIFT CONTROL DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 634 days.

(21) Appl. No.: 11/343,205

(22) Filed: Jan. 31, 2006

(65) Prior Publication Data

US 2007/0193389 A1    Aug. 23, 2007

(51) Int. Cl.
*F16C 1/10* (2006.01)
(52) U.S. Cl. ................................................ 74/502.2
(58) Field of Classification Search ............... 74/500.5, 74/501.6, 502.2
See application file for complete search history.

(56) References Cited

U.S. PATENT DOCUMENTS

| | | | |
|---|---|---|---|
| 4,840,081 A | 6/1989 | Nagano | |
| 5,012,692 A | 5/1991 | Nagano | |
| 5,044,213 A | 9/1991 | Nagano | |
| 5,203,213 A | 4/1993 | Nagano | |
| 5,241,878 A | 9/1993 | Nagano | |
| 5,257,683 A | 11/1993 | Romano | |
| 5,400,675 A | 3/1995 | Nagano | |
| 5,479,776 A | 1/1996 | Romano | |
| 5,575,178 A * | 11/1996 | Wu | 74/489 |
| 5,666,858 A * | 9/1997 | Von Der Osten-Sacken et al. | 74/489 |
| 5,682,794 A | 11/1997 | Shibata | |
| 5,730,030 A | 3/1998 | Masui | |
| 6,066,057 A | 5/2000 | Nakamura et al. | |
| 6,073,730 A | 6/2000 | Abe | |
| 6,216,078 B1 | 4/2001 | Jinbo et al. | |
| 6,502,477 B1 | 1/2003 | Assel | |
| 6,647,823 B2 | 11/2003 | Tsumiyama et al. | |
| 2002/0124679 A1 | 9/2002 | Dal Pra | |
| 2004/0005947 A1 | 1/2004 | Shahana et al. | |
| 2004/0144193 A1 | 7/2004 | Sato et al. | |
| 2005/0126329 A1 | 6/2005 | Blaschke | |

FOREIGN PATENT DOCUMENTS

| | | |
|---|---|---|
| DE | 100 55 403 A1 | 5/2002 |
| EP | 1 232 940 A2 | 8/2002 |
| EP | 1 245 483 A2 | 10/2002 |
| EP | 1 264 764 A2 | 12/2002 |
| EP | 1 440 878 A2 | 7/2004 |

\* cited by examiner

*Primary Examiner*—Vicky A Johnson
(74) *Attorney, Agent, or Firm*—Global IP Counselors, LLP

(57) ABSTRACT

A bicycle shift control device is provided with a stroke length control arrangement that allows the rider to selectively regulate at least one shift operating member between a single gear shifting operation position and a multiple gear shifting operation position. In the illustrated embodiment, the bicycle shift control device has a gear shifting mechanism that is operated by a pair shift operating members (levers). The stroke length control arrangement selectively limits movement of the shift operating member in a range of movement between the rest position and an intermediate actuating position by preventing the shift operating member from being moved past the intermediate actuating position to the fully actuating position.

15 Claims, 11 Drawing Sheets

BICYCLE SHIFT CONTROL DEVICE

BACKGROUND OF THE INVENTION

1. Field of the Invention

This invention generally relates to a bicycle shift control device. More specifically, the present invention relates to a bicycle shift control device that allows the rider to selectively regulate between a single gear shifting and a multiple gear shifting operation in a single progressive shifting operation.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. Some conventional cable operated shifting devices of this type are configured such that the shift lever can be move to cause the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism. More recently, some cable operated shifting devices have been developed that allow multiple gear shifts in a single operation of one or both of the shift levers. One example of a bicycle shift control device with multiple gear shifting in a single progressive shifting operation is disclosed in U.S. Patent Application Publication No. US2004/0144193A (assigned to Shimano, Inc.). However, with theses multiple gear shift control devices, the rider some times will accidentally shift two gears when only a single gear shift was desired. Thus, some riders prefer to have a bicycle shift control device that only moves one gear at a time in a single progressive shifting operation.

In view of the above, it will be apparent to those skilled in the art from this disclosure that there exists a need for an improved bicycle shift control device. This invention addresses this need in the art as well as other needs, which will become apparent to those skilled in the art from this disclosure.

SUMMARY OF THE INVENTION

One object of the present invention is to provide a bicycle shift control device with a stroke length control arrangement that selectively regulate a range of movement of an operating member.

Another object of the present invention is to provide a bicycle shift control device with a stroke length control arrangement that allows the rider to selectively regulate an operating member between a single gear shifting operation position and a multiple gear shifting operation position.

Another object of the present invention is to provide a bicycle shift control device with a stroke length control arrangement that is relatively simple and inexpensive to manufacture and assemble.

The foregoing objects can basically be attained by providing a bicycle shift control device that basically comprises a shifter housing, a gear shifting mechanism, a shift operating member and a stroke length control arrangement. The gear shifting mechanism is disposed in the shifter housing with the gear shifting mechanism having a plurality of gear positions. The shift operating member is operatively coupled to the gear shifting mechanism, the shift operating member being movable between a rest position and a fully actuating position. The stroke length control arrangement is configured and arranged to selectively limit movement of the shift operating member in a range of movement between the rest position and an intermediate actuating position by preventing the shift operating member from being moved past the intermediate actuating position to the fully actuating position.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
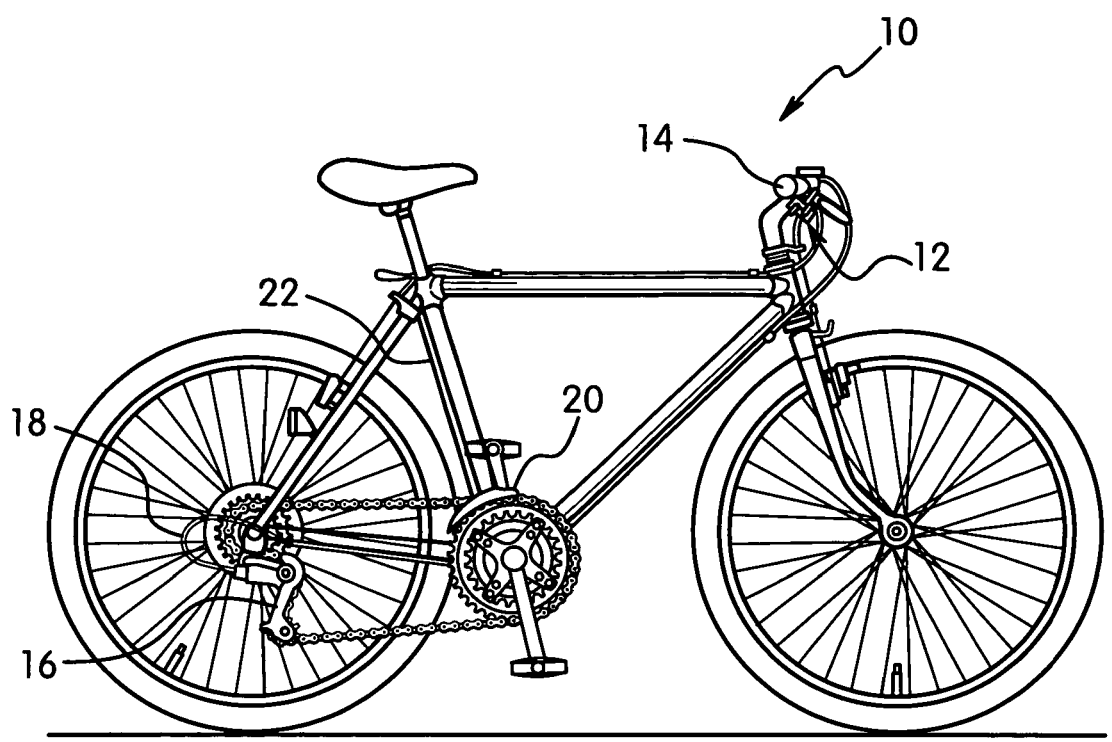
FIG. 1 is a side elevational view of a bicycle equipped with a pair of control devices (only one shown) in accordance with one embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18. Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 20 via a shift control cable 22. Alternatively, the control devices can be switched so that the rider can operate the rear derailleur 16 and the front derailleur 20 with opposite hands. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18 and 22 are conventional bicycle cables that have an outer casing that covers an inner wire. For example, the shift control cable 18 has an inner wire 18a and an outer casing 18b.

Referring now to FIGS. 2-5, the bicycle control device 12 is illustrated in the rest position. The bicycle control device 12 basically includes a mounting portion or member 31, a shifter housing 32, a gear shifting mechanism 33, a shift release lever 34, a shift winding lever 35 and a stroke length control arrangement 36. As explained below, the shift release lever 34 and the shift winding lever 35 are shift operating members that are operatively coupled to the gear shifting mechanism 33 to release or wind the inner wire 18a of the shift control cable 18 to shift the rear derailleur 16. The gear shifting mechanism 33 is configured and arranged so that the rider can perform a multiple gear shifting operation in a single progressive shifting operation in a first gear shift direction with the shift release lever 34 and in a second gear shift direction with the shift winding lever 35. Specifically, when the shift release lever 34 is moved from a rest position to a fully actuating position, the gear shifting mechanism 33 is operated to cause a multiple gear shifting (wire releasing) operation in a single progressive shifting operation. However, when the shift release lever 34 is moved from a rest position to an intermediate actuating position (i.e., not to the fully actuating position), then the gear shifting mechanism 33 is operated to cause a single gear shifting (wire releasing) operation (or a less number of gear shifting positions than when fully actuated) in a single progressive shifting operation. Likewise, when the shift winding lever 35 is moved from a rest position to a fully actuating position, the gear shifting mechanism 33 is operated to cause a multiple gear shifting (wire winding) operation in a single progressive shifting operation. However, when the shift winding lever 35 is moved from a rest position to an intermediate actuating position (i.e., not to the fully actuating position), then the gear shifting mechanism 33 is operated to cause a single gear shifting (wire winding) operation (or a less number of gear shifting positions than when fully actuated) in a single progressive shifting operation.

Turning now to FIGS. 6-11, the stroke length control arrangement 36 basically includes a control member 37, a mounting plate 38 and a biasing element 39. In the illustrated embodiment, the stroke length control arrangement 36 is configured and arranged so that the rider can selectively regulate the shift release lever 34 and the shift winding lever 35 between a single gear shifting operating position and a multiple gear shifting operating position. In other words, the stroke length control arrangement 36 is configured and arranged to selectively limit movement of the shift release lever 34 and the shift winding lever 35 in a range of movement between a rest position of the levers 34 and 35 and an intermediate actuating position of the levers 34 and 35 by preventing of the levers 34 and 35 from being moved past their intermediate actuating positions to their fully actuating positions. Of course, it will be apparent to those skilled in the art from this disclosure that the stroke length control arrangement 36 can be configured so that the rider can select between a stroke non-limiting position that allows the levers 34 and 35 to be moved from their rest positions past intermediate actuating positions to the fully actuating position and a stroke limiting position that restricts the levers 34 and 35 from being moved past a predetermined intermediate actuating position. This predetermined intermediate actuating position can be a single gear shifting position or a multiple gear shifting position that results in a multiple gear shift that is less than the number of gear shifting positions that occur when the lever 34 or 35 is fully actuated. Moreover, it will be apparent to those skilled in the art from this disclosure that the stroke length control arrangement 36 can be configured so that it operates on only one of the lever 34 or 35. Alternatively, it will be apparent to those skilled in the art from this disclosure that the stroke length control arrangement 36 can be configured so that it controls the lever 34 or 35 independently of each other, i.e., the rider set one of the lever 34 or 35 to the stroke non-limiting position and the other one of the levers 34 and 35 to the stroke limiting position.

The stroke control member 37 is configured to be selectively moved by a rider (user) between the stroke non-limiting position that allows the lever 34 or 35 to be moved from the rest position past the intermediate actuating position to the fully actuating position and the stroke limiting position that restricts the lever 34 or 35 from being moved past the intermediate actuating position. In the illustrated embodiment, the control member 37 is preferably a one-piece, unitary member that includes a control shaft 40 with a user operable part 41 disposed at an upper end of the control shaft 40. The control member 37 is preferably constructed of a hard rigid material such as a metallic material.

The control shaft 40 is pivotally mounted within the shifter housing 32 by the mounting plate 38 between the stroke non-limiting position (FIGS. 2, 3, 6, 9, 21 and 22) and the stroke limiting position (FIGS. 4, 5, 8, 11 and 18-20). In particular, the control shaft 40 is rotated about its pivot axis about ninety degrees when switching between the stroke non-limiting position and the stroke limiting position. The biasing element 39 urges the control shaft 40 against the shifter housing 32 to selectively retain the control shaft 40 in one of the stroke non-limiting position and the stroke limiting position. Thus, to switch between the stroke non-limiting position and the stroke limiting position, the user or rider pushes the control shaft 40 in an axial direction against the urging force of the biasing element 39 so that the control shaft 40 can then be rotated.

The control shaft 40 is configured and arranged such that a part of the control shaft 40 is located in a shifting path of the (shift operating members) levers 34 and 35 to directly contact a part of each of the levers 34 and 35 when the control shaft 40 is in the stroke limiting position and the lever 34 or 35 is moved to the intermediate actuating position. In particular, the control shaft 40 has a centrally located stop or abutment 40a that divides the control shaft 40 into an upper portion and a lower portion. The upper portion of the control shaft 40 includes a notched section 40b formed by a pair of notches for attaching the control shaft 40 to the mounting plate 38. The lower portion of the control shaft 40 includes a cutout 40c that is configured and arranged such that the levers 34 and 35 can move from their rest positions past the intermediate actuating positions to their fully actuating positions when the control shaft 40 is in the stroke non-limiting position.

The user operable part 41 of the control shaft 40 is accessible through an opening in the shifter housing 32 without disassembling the bicycle shift control device 12. The biasing element 39 is configured and arranged to hold the user operable part 41 against an interior surface of the shifter housing 32 with the user operable part 41 disposed in the opening in the shifter housing 32. Preferably, the biasing element 39 is a coiled compression spring that is coaxially mounted on the upper portion of the control shaft 40. The biasing element 39 is configured and arranged such that one end of the biasing element 39 contacts the user operable part 41 and the other end of the biasing element 39 contacts the mounting plate 38 such that the abutment 40a is normally contacting the mounting plate 38.

Figure 9:
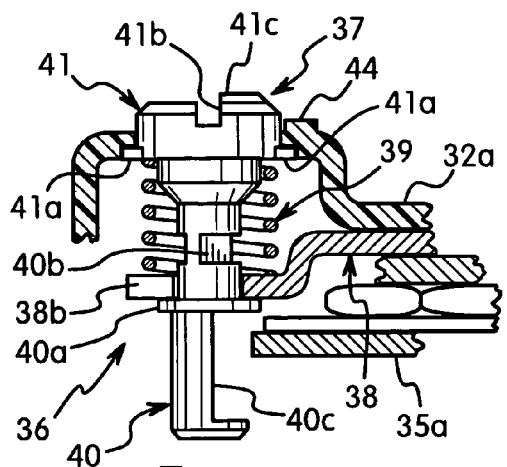
FIG. 9 is a simplified front side elevational view of the stroke length control arrangement and a portion of the housing shown in cross section to illustrate the engagement between the control member of the stroke length control arrangement and the housing when in the stroke non-limiting position.
Figure 10:
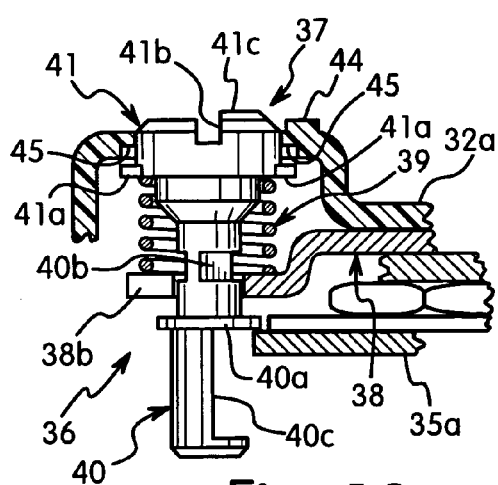
FIG. 10 is a simplified front side elevational view, similar to FIG. 9, of the stroke length control arrangement and a portion of the housing shown in cross section but with the control member of the stroke length control arrangement being depressed so that it can be moved from the stroke non-limiting position to the stroke limiting position.

As seen in FIGS. 9 and 10, preferably, the user operable part 41 is provided with two detents 41a that are configured and arranged to engage the interior surface of the shifter housing 32 for holding the control shaft 40 from moving relative to the shifter housing 32. The user operable part 41 also preferably has an upper surface with a tool engaging recess or slot 41b and a position indicator 41c. The tool engaging recess or slot 41b is configured and arranged such that a tool such as a screw driver can be used to rotate the control shaft 40 about its pivot axis to switch between the stroke non-limiting position and the stroke limiting position. Thus, the control shaft 40 is attached to the user operable part 41 such that the control shaft 40 is rotated in response to rotational movement of the user operable part 41.

The mounting plate 38 is preferably a metal plate that has a mounting hole 38a at one end and a slot 38b at the other end. The mounting hole 38a is a non-circular hole that is used to retain the mounting plate 38 in a non-movable position relative to the shifter housing 32. The slot 38b is configured and arranged to support the control shaft 40 for both linear axis movement and rotational movement about the pivot axis of the control shaft 40. Preferably, the slot 38b has a control shaft inserting mouth and a control shaft retaining section. The control shaft inserting mouth of the slot 38b has a maximum width that is smaller than the maximum width of the control shaft retaining section of the slot 38b. In particular, the control shaft inserting mouth of the slot 38b is dimension and arranged so that the notched section 40b of the control shaft 40 with the two notches can be inserted into the control shaft retaining section of the slot 38b by aligning the notched section 40b with the control shaft inserting mouth of the slot 38b. Thus, the control shaft 40 is then located in the control shaft retaining section of the slot 38b. The control shaft retaining section of the slot 38b is dimension and arranged so that the upper portion of the control shaft 40 is retained therein to attach the control shaft 40 to the mounting plate 38.

Figure 2:
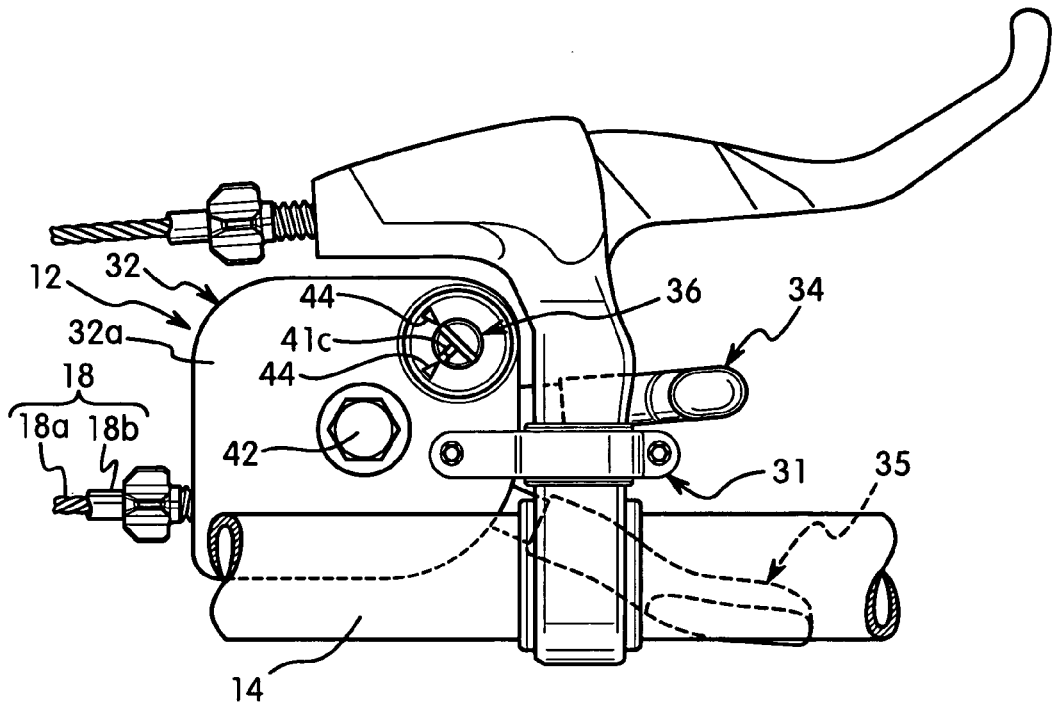
FIG. 2 is a top plan view of the bicycle control device illustrated in FIG. 1, with a pair of operating members (shift levers) in their rest positions and a stroke length control arrangement in a stroke non-limiting position.
Figure 3:
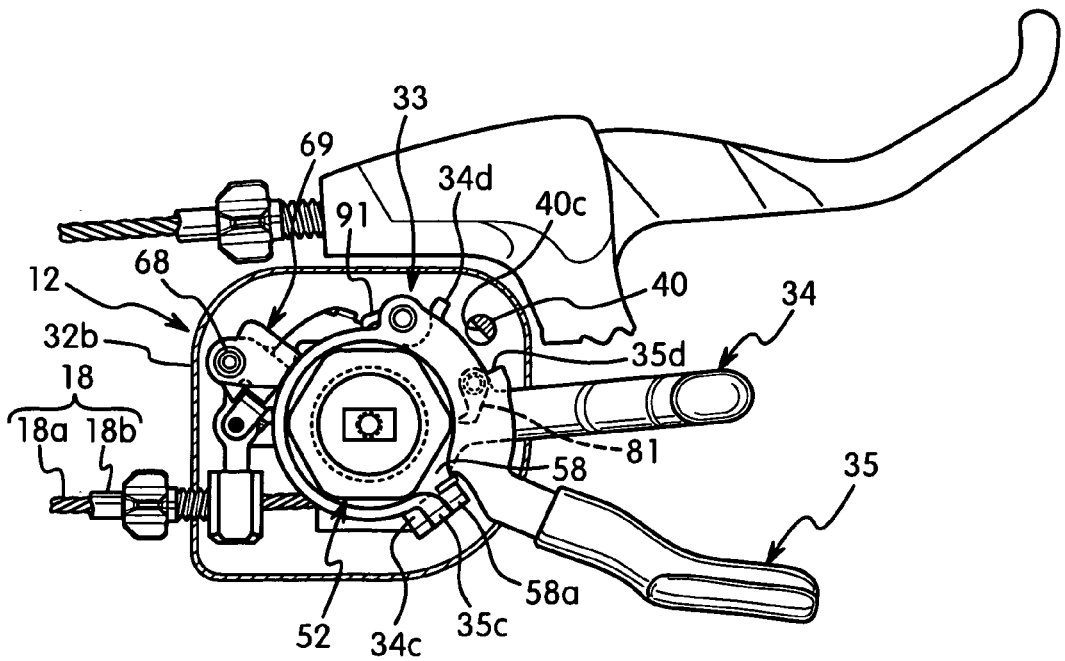
FIG. 3 is a top plan view of the bicycle control device illustrated in FIG. 2, with the upper part of the housing broken away to illustrated the gear shifting mechanism in the rest position and the stroke length control arrangement in the stroke non-limiting position.
Figure 4:
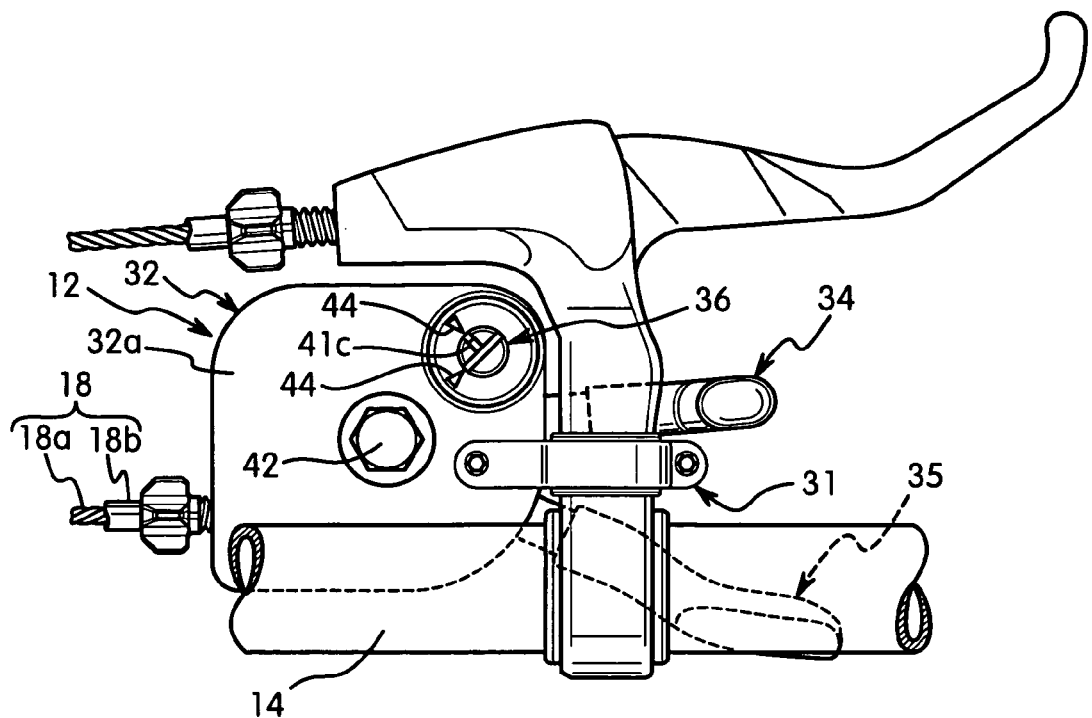
FIG. 4 is a top plan view of the bicycle control device illustrated in FIGS. 2 and 3, with the pair of operating members (shift levers) in their rest positions and the stroke length control arrangement in a stroke limiting position.
Figure 5:
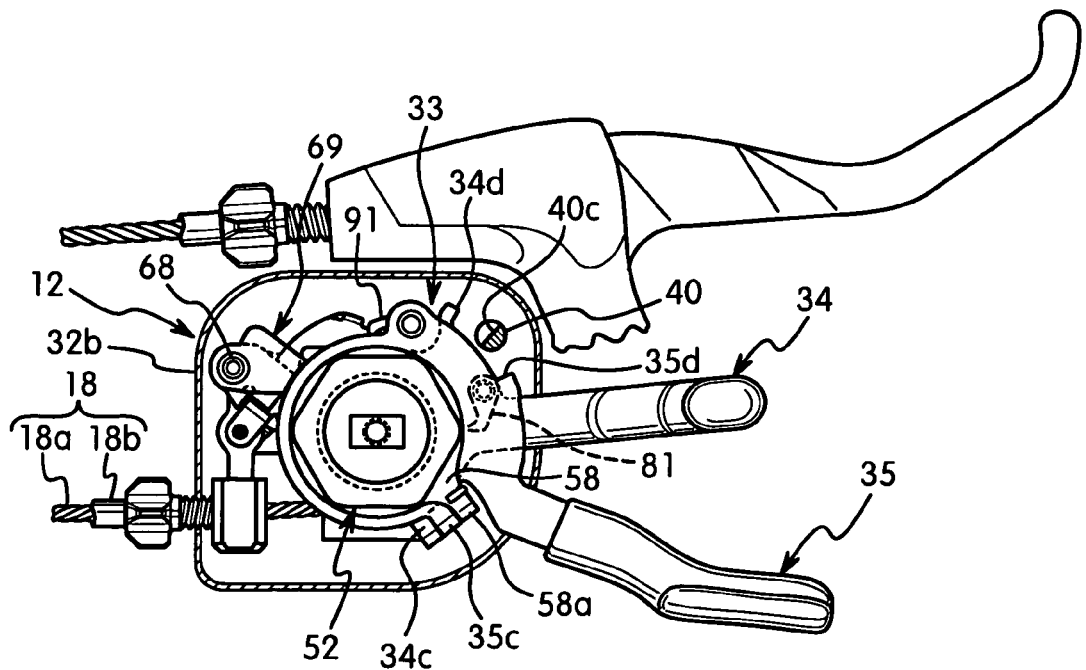
FIG. 5 is a top plan view of the bicycle control device illustrated in FIGS. 2-4, with the upper part of the housing broken away to illustrated the gear shifting mechanism in the rest position and the stroke length control arrangement in the stroke limiting position.

As best seen FIGS. 2 and 4, the mounting member 31 is attached to the shifter housing 32 and a brake lever to support the bicycle control device 12 on the bicycle handlebar 14. Of course, it will be apparent to those skilled in the art from this disclosure that the mounting member 31 can be configured and arranged to be directly mounted to the bicycle handlebar 14. Thus, the mounting member 31 can be conventional split bore type of clamping arrangement in which the diameter of the bore is varied by a fixing bolt in a conventional manner. The construction of the mounting member 31 can be relatively conventional in construction, and thus, will not be discussed or illustrated in further detail herein.

The shifter housing 32 is preferably constructed of two or more pieces that are fixedly coupled together to enclose the gear shifting mechanism 33. In the illustrated embodiment, the shifter housing 32 basically includes an upper casing 32a and a lower casing 32b that are coupled to the gear shifting mechanism 33 by a pair of fasteners or screws 42 and 43. The upper and lower casings 32a and 32b are preferably constructed of a light weight material such a hard, rigid plastic material. The shifter housing 32 is sized and configured to form an internal cavity for receiving the gear shifting mechanism 33.

The shifter housing 32 is configured and arranged so that the stroke length control arrangement 36 can be easily operated when the shifter housing 32 mounted (directly or indirectly) to the bicycle handlebar 14 via the mounting member 31. Preferably, as seen in FIGS. 2 and 4, the upper casing 32a is provided with indicia 44 (e.g., two triangles) on an upper exterior surface of the upper casing 32a to indicate whether the stroke length control arrangement 36 is in the stroke non-limiting position (FIG. 2) or the stroke limiting position (FIG. 4) by being aligned with the position indicator 41c of the user operable part 41 of the control member 39.

Figure 11:
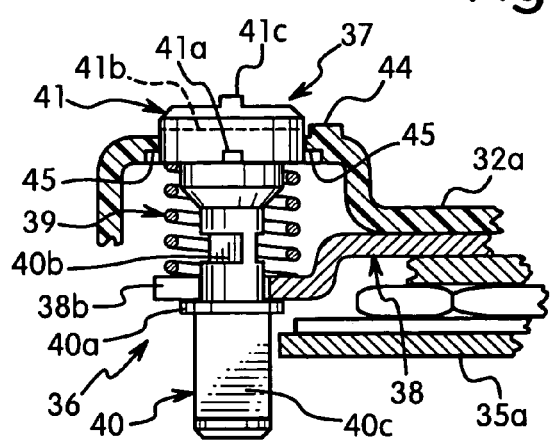
FIG. 11 is a simplified front side elevational view, similar to FIGS. 9 and 10, of the stroke length control arrangement and a portion of the housing shown in cross section but with the control member of the stroke length control arrangement moved to the stroke limiting position.

As best seen in FIGS. 9-11 and 13, the upper casing 32a is provided with four notches 45 on an interior surface. These notches 45 form part of the stroke length control arrangement 36 to selectively retain the stroke length control arrangement 36 in the stroke non-limiting position (FIG. 9) or the stroke limiting position (FIG. 11). In particular, two of the notches 45 are engaged by the detents 41a of the user operable part 41 for holding the control shaft 40 from moving relative to the shifter housing 32 in either the stroke non-limiting position (FIG. 9) or the stroke limiting position (FIG. 11).

Figure 6:
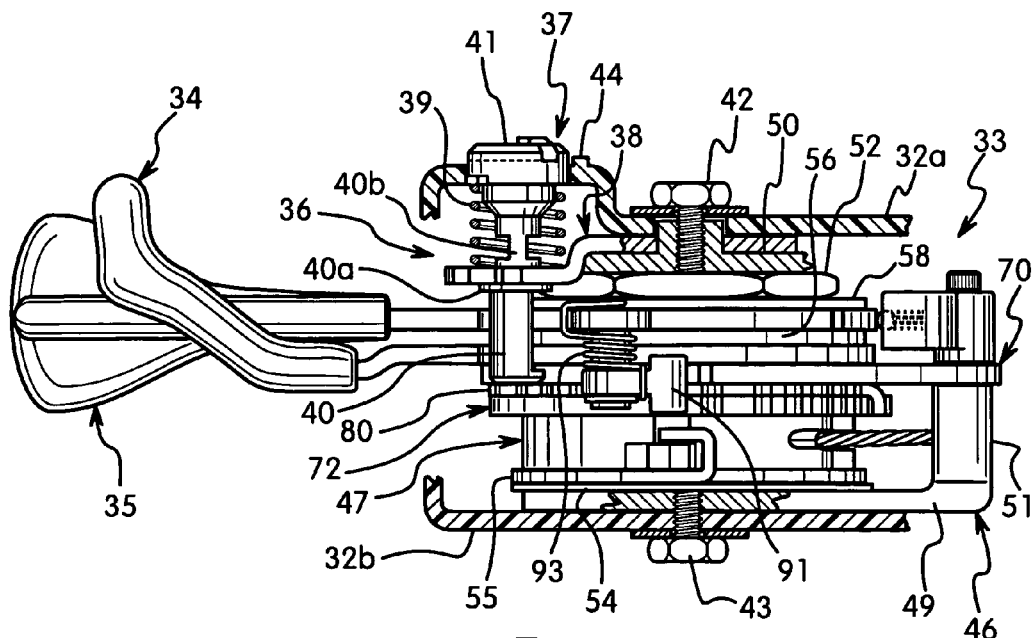
FIG. 6 is a simplified front side elevational view of the bicycle control device illustrated in FIGS. 2-5, with the housing broken away to illustrated the gear shifting mechanism in the rest position and the stroke length control arrangement in the stroke non-limiting position.
Figure 7:
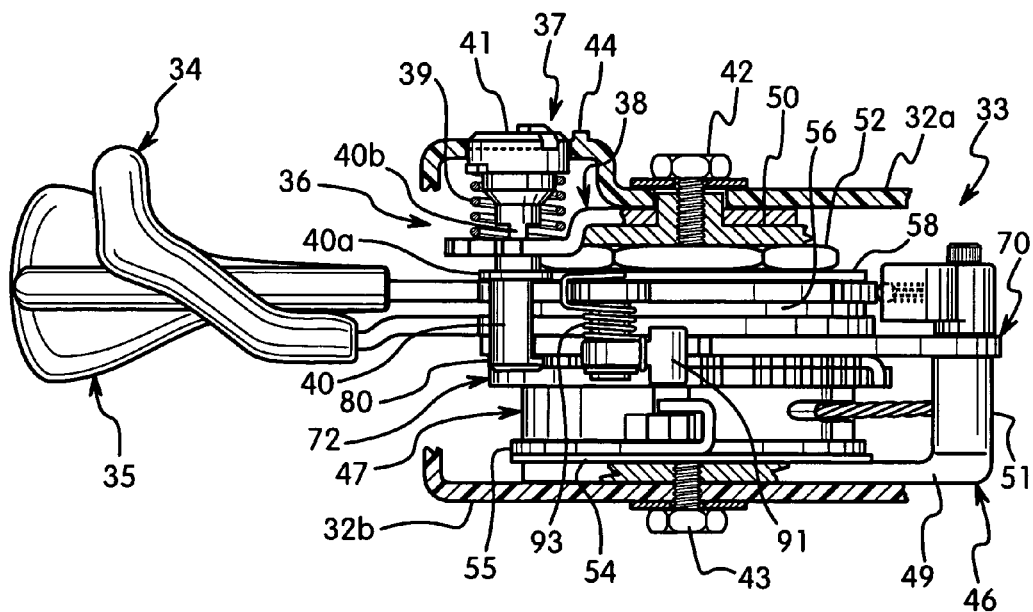
FIG. 7 is a simplified front side elevational view of the bicycle control device, similar to FIG. 6, but with the control member of the stroke length control arrangement being depressed so that it can be moved from the stroke non-limiting position to the stroke limiting position.
Figure 8:
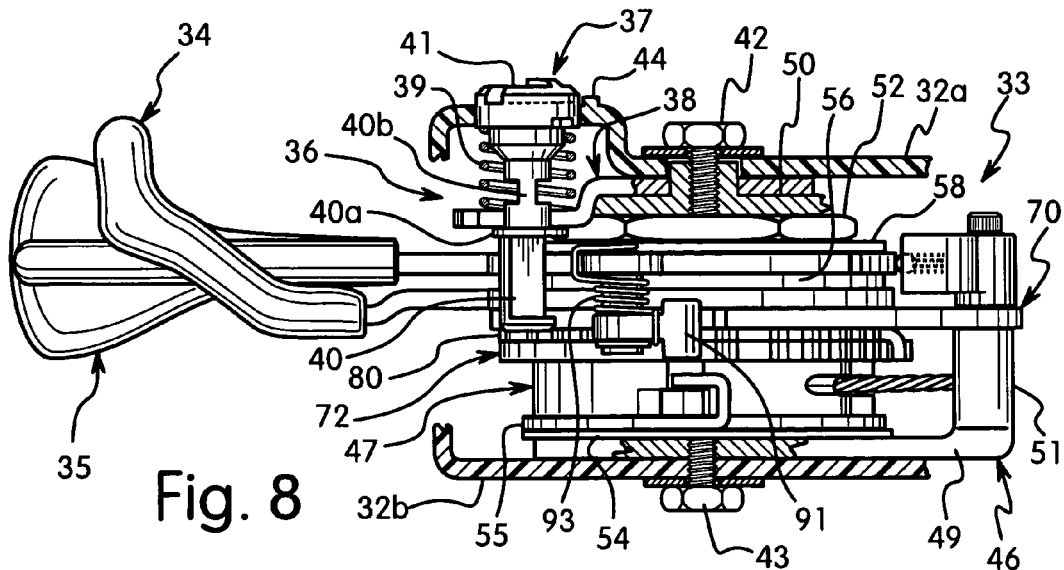
FIG. 8 is a simplified front side elevational view of the bicycle control device, similar to FIGS. 6 and 7, but with the control member of the stroke length control arrangement moved to the stroke limiting position.

As best seen FIGS. 6-8, the gear shifting mechanism 33 is disposed in the shifter housing 32 with the gear shifting mechanism 33 being configured and arranged with a plurality of gear positions that attained by moving the shift release lever 34 in a clockwise direction and by moving the shift winding lever 35 in a counterclockwise direction (when viewed from a top plan view as shown in FIG. 2). The stroke length control arrangement 36 acts as a limiting device that selectively blocks movement of both the shift release lever 34 and the shift winding lever 35 so that the rider can set the gear shifting mechanism 33 to operate either as a single gear shifting operating mechanism and a multiple gear shifting operating mechanism. While a specific gear shifting mechanism is illustrated and described herein, it will be apparent to those skilled in the art from this disclosure that the stroke length control arrangement 36 can be utilized in other types of gear shifting mechanisms so long as it has one operating member that can perform a multiple-stage gear shift operation in a single progress shifting operation.

Figure 12:
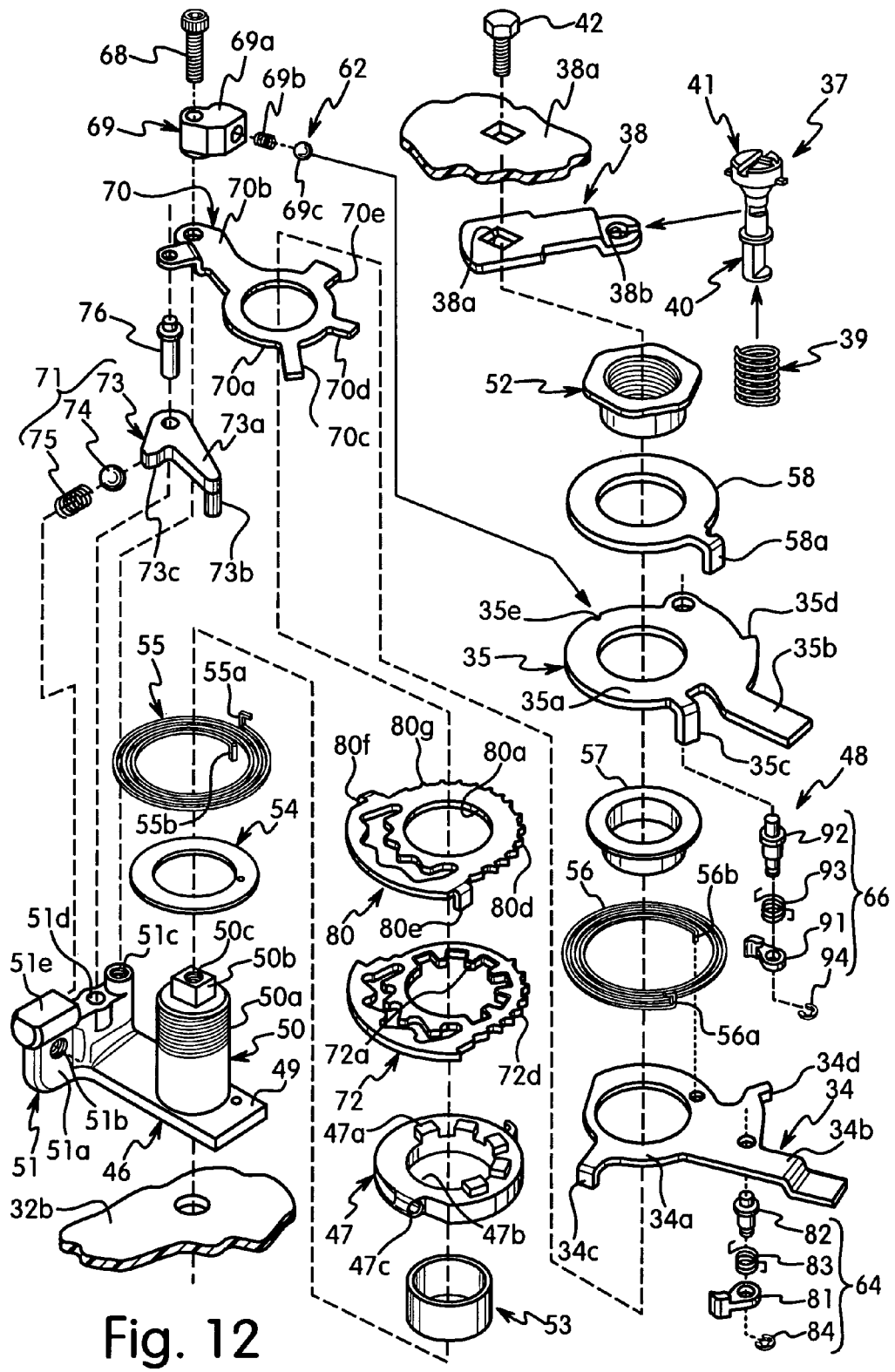
FIG. 12 is an exploded perspective view of the bicycle control device illustrated in FIGS. 1-8 in accordance with the illustrated embodiment of the present invention.
Figure 13:
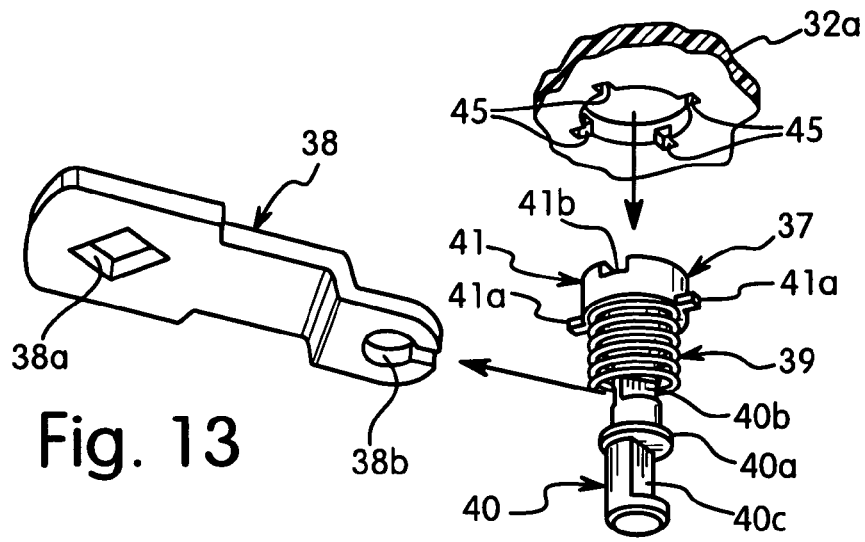
FIG. 13 is an exploded perspective view of the stroke length control arrangement and a portion of the housing shown in cross section, which illustrates the installation of the stroke length control arrangement.
Figure 14:
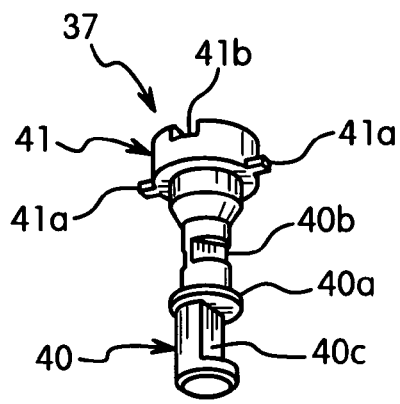
FIG. 14 is a bottom perspective view of the control member of the stroke length control arrangement in accordance with the illustrated embodiment of the present invention.
Figure 15:
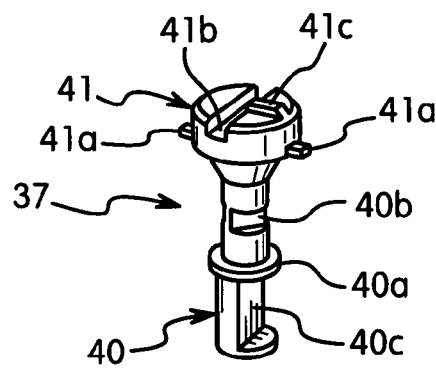
FIG. 15 is a top perspective view of the control member of the stroke length control arrangement in accordance with the illustrated embodiment of the present invention.
Figure 16:
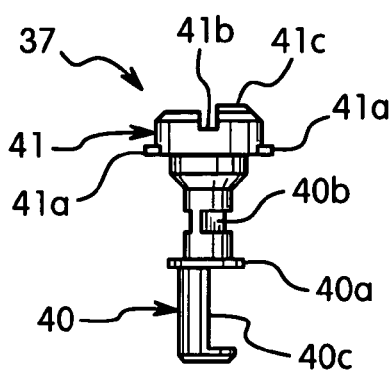
FIG. 16 is a first side elevational view of the control member of the stroke length control arrangement in accordance with the illustrated embodiment of the present invention.

As best seen in FIG. 12, the gear shifting mechanism 33 is a mechanical arrangement that basically includes a main support member 46, a wire takeup member 47 and a shift wire position control mechanism 48. The gear shifting mechanism 33 is configured and arranged such that the inner wire 18a of the shift control cable 18 can be pulled and released to selectively effect either a single-stage gear shift operation or a multiple-stage gear shift operation in a single progress shifting operation as explained below. In particular, the shift release lever 34 and the shift winding lever 35 are shift operating members that are operatively coupled to the gear shifting mechanism 33 to release or wind the inner wire 18a of the shift control cable 18 to shift the rear derailleur 16.

As best seen in FIG. 12, the main support member 46 of the gear shifting mechanism 33 basically includes a bottom support plate 49 with a pivot shaft 50 and a control mounting structure 51. The main support member 46 is made of a hard rigid material such as a metallic material. The lower casing 32b is fastened to the main support member 46 by the screw 43.

The pivot shaft 50 pivotally supports the shift release lever 34, the shift winding lever 35 and the wire takeup member 47 about a single pivot axis. Thus, the shift release lever 34 is operatively coupled to the gear shifting mechanism 33 to rotate the wire takeup member 47 about the pivot shaft 50 in a wire releasing (clockwise) direction. The shift winding lever 35 is operatively coupled to the gear shifting mechanism 33 to rotate the wire takeup member 47 about the pivot shaft 50 in a wire winding (counterclockwise) direction. The upper end of the pivot shaft 50 is provides with external threads 50a and a non-circular projection 50b. The external threads 50a of the pivot shaft 50 threadedly receives a nut 52 that retains the parts of the gear shifting mechanism 33, the shift release lever 34 and the shift winding lever 35 on the pivot shaft 50. The non-circular projection 50b engages the mounting hole 38a of the mounting plate 38 to retain the mounting plate 38 in a non-movable position relative to the shifter housing 32. In particular, the non-circular projection 50b includes a threaded hole 50c that threadedly receives the screw 42 to secure the upper casing 32a and the mounting plate 38 to the upper end of the pivot shaft 50.

The control mounting structure 51 is configured and arranged to support selected parts of the shift wire position control mechanism 48 of the gear shifting mechanism 33 as explained below. The control mounting structure 51 basically has a wall 51a with a threaded hole 51b extending through the wall 51a, a threaded blind bore 51c formed in the upper edge of the wall 51a, an unthreaded pivot bore 51d formed in the upper edge of the wall 51a and a detent barrel 51e formed on the upper edge of the wall 51a.

As best seen in FIG. 12, the wire takeup member 47 is a one piece unitary member made from a hard, rigid plastic material. The wire takeup member 47 is basically a ring shaped member that is rotatably mounted around the pivot shaft 50. The wire takeup member 47 is preferably mounted on the pivot shaft 50 with a tubular washer 53 disposed therebetween. The tubular washer 53 is configured and arranged to maintain the proper axial spacing of the parts of the shift wire position control mechanism 48. In particular, the tubular washer 53 has a first (lower) end that contacts a spring supporting ring 54, and a second (upper) end that contacts a portion of the nut 52 such that the parts can freely rotate on the pivot shaft 50. Thus, the tubular washer 53 prevents the nut 52 from squeezing the shift wire position control mechanism 48.

Still referring to FIG. 12, the wire takeup member 47 is biased in the wire releasing (counterclockwise) direction about a rotational shift axis by a wire takeup biasing member 55. In the illustrated embodiment, the wire takeup biasing member 55 is a coiled torsion spring that has one end 55a coupled to a hook of the wire takeup member 47 and a second end 55b located in a hole formed in the bottom support plate 49. When the bicycle control device 12 is in the normal rest position, the wire takeup member 47 is preloaded by the wire takeup biasing member 55 and a return spring (not shown) in the rear derailleur 16 to maintain the shift position.

Figure 19:
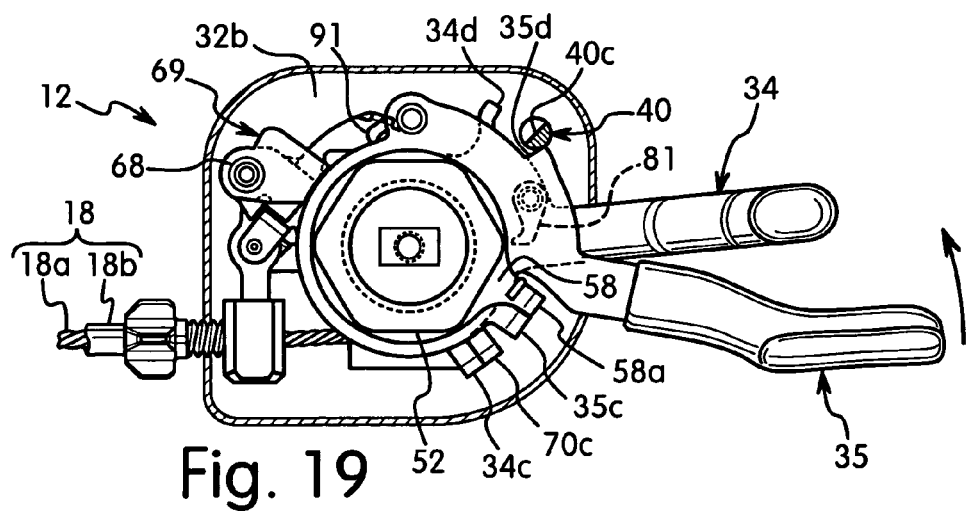
FIG. 19 is a top plan view of the gear shifting mechanism with the upper part of the housing broken away to illustrated the winding lever moved to a single gear shift position when the stroke length control arrangement is in the stroke limiting position.
Figure 20:
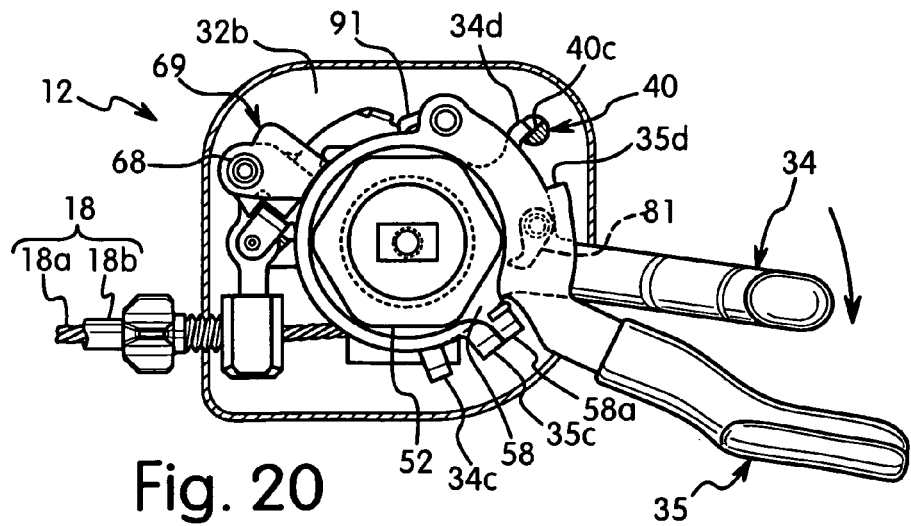
FIG. 20 is a top plan view of the gear shifting mechanism with the upper part of the housing broken away to illustrated the release lever moved to a single gear shift position when the stroke length control arrangement is in the stroke limiting position.
Figure 21:
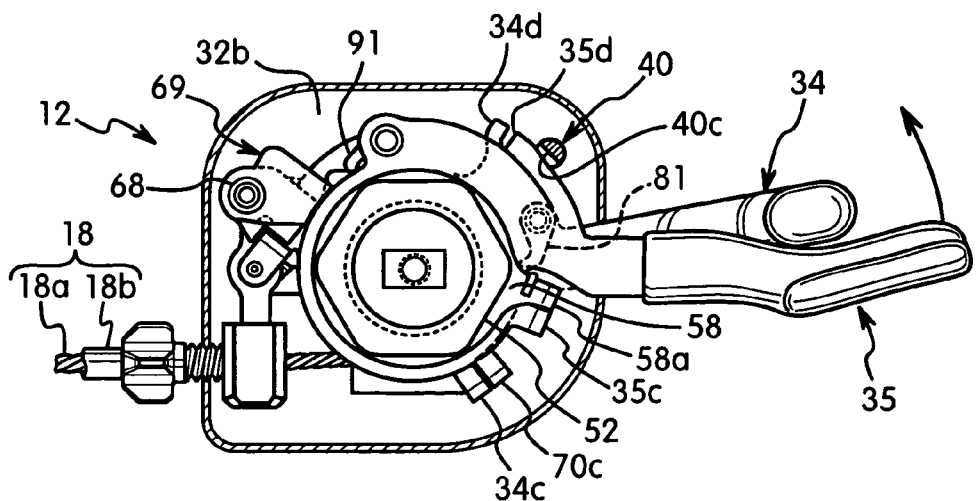
FIG. 21 is a top plan view of the gear shifting mechanism with the upper part of the housing broken away to illustrated the winding lever moved to a multiple gear shift position when the stroke length control arrangement in the stroke non-limiting position.
Figure 22:
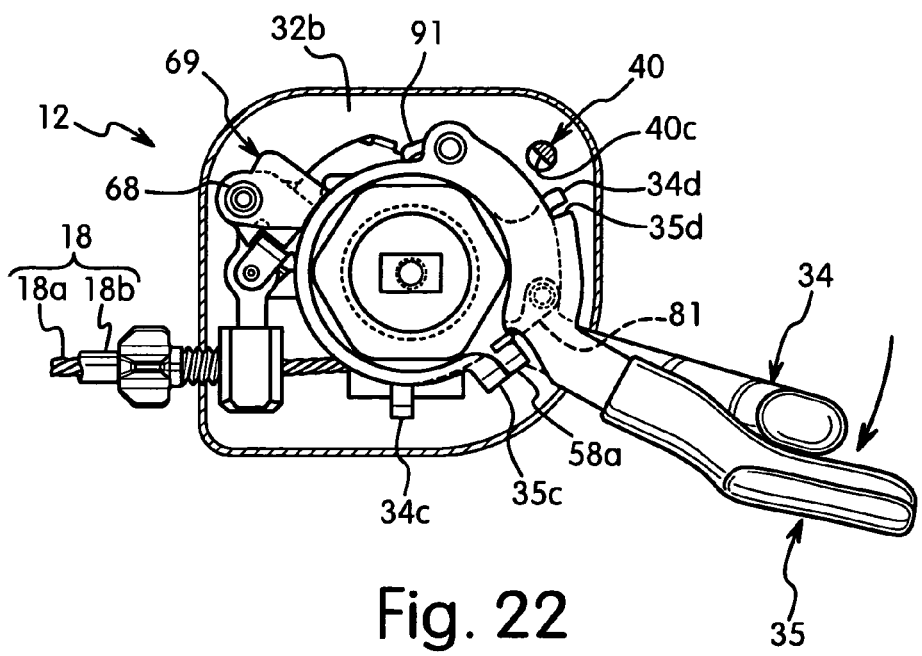
FIG. 22 is a top plan view of the gear shifting mechanism with the upper part of the housing broken away to illustrated the release lever moved to a multiple gear shift position when the stroke length control arrangement in the stroke non-limiting position.
Figure 23:
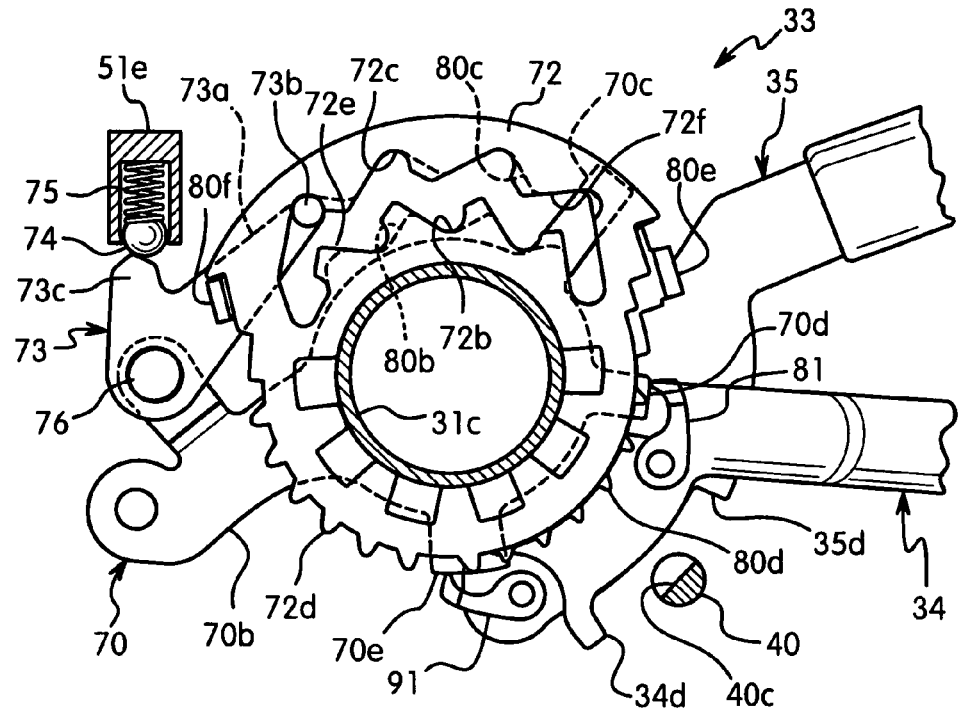
FIG. 23 is a simplified rear side elevational view of the gear shifting mechanism with the selected parts removed to show the gear shifting mechanism in its normal rest position with the inner wire of the rear shift cable fully retracted on the wire takeup member.
Figure 24:
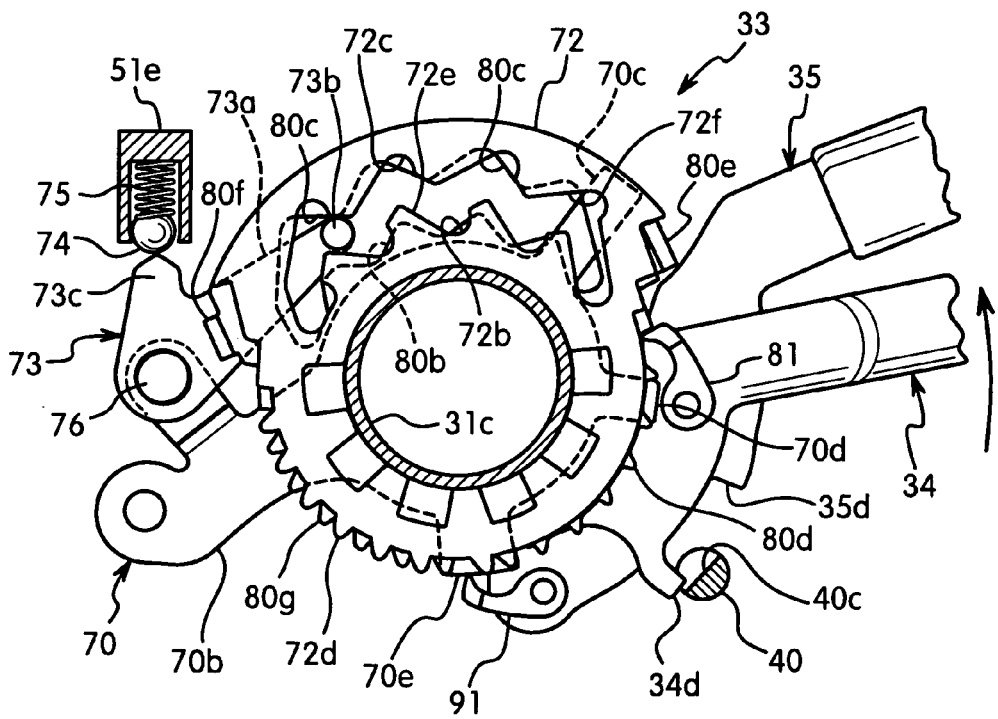
FIG. 24 is a simplified rear side elevational view of the gear shifting mechanism, similar to FIG. 23, but with the shift release lever being moved in a shift wire releasing direction such that the cam releasing plate is moved by the release pawl to move the detent member to a release position.
Figure 25:
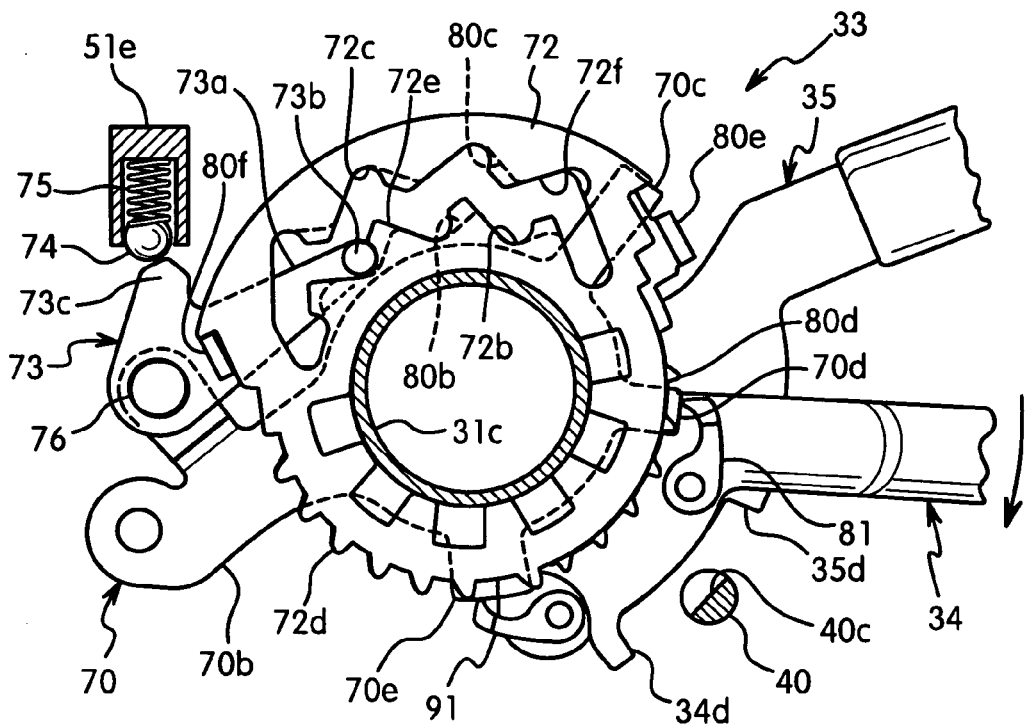
FIG. 25 is a simplified rear side elevational view of the gear shifting mechanism, similar to FIGS. 23 and 24, but after the release lever has been moved in a shift wire releasing direction resulting in the detent member being moved to the next shift position in the wire releasing direction and then returned to the rest position.
Figure 26:
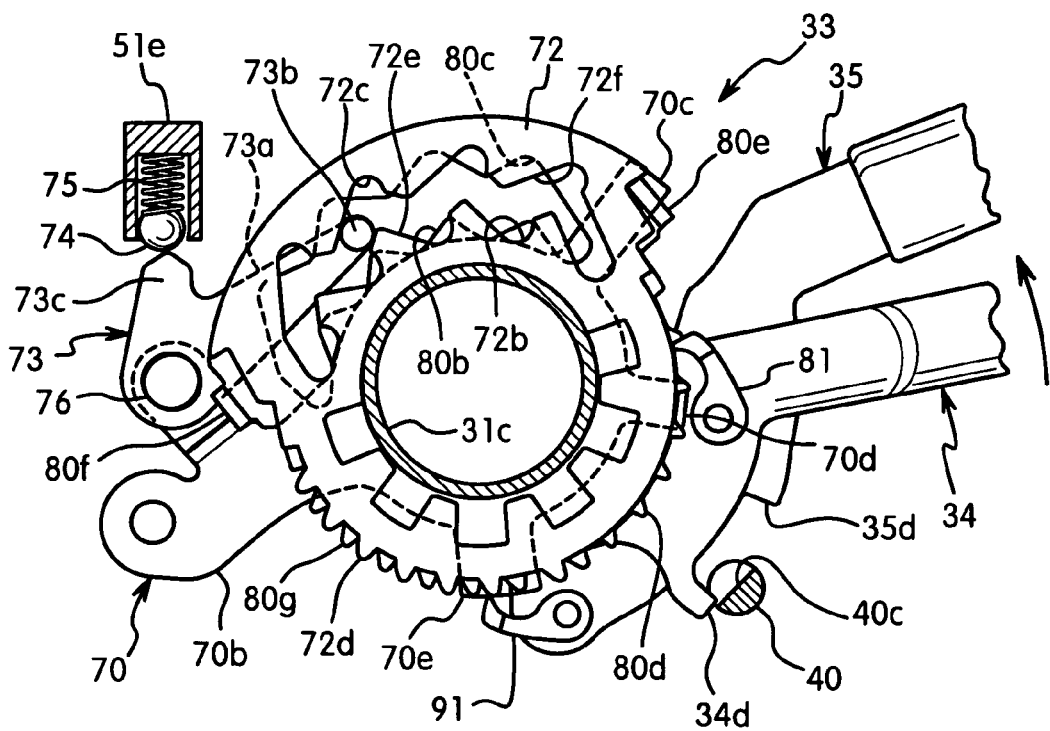
FIG. 26 is a simplified rear side elevational view of the gear shifting mechanism, similar to FIGS. 23-25, but with the release lever being moved in a shift wire releasing direction such that the cam releasing plate is moved by the release pawl to move the detent member to a release position.

As best seen in FIG. 12, the wire takeup member 47 has a plurality of projections 47a that surround a center opening 47b and a cable attachment point 47c located on its peripheral surface. The inner wire 18a of the rear shift cable 18 is attached at one to the cable attachment point 47c and at the other end to the rear derailleur 16. Thus, the inner wire 18a is wound around the periphery of the wire takeup member 47 when the inner wire 18a is being pulled, as seen in FIGS. 19 and 21, to operate the rear derailleur 16.

Preferably, the shift release lever 34 and the shift winding lever 35 are configured as trigger type of levers that spring back to a rest position after being operated to the shift position. In particular, the levers 34 and 35 are biased by a biasing member 56 to their rest positions. Preferably, the levers 34 and 35 are pivotally mounted on the pivot shaft 50 to pivot relative to the shifter housing 32.

The levers 34 and 35 are maintained in their rest position by a lever returning arrangement that includes a spacer member 57 and a pushing washer 58. The biasing member 56 is preferably a torsion spring with a first end 56a contacting a tab 58a of the pushing washer 58 which in turn pushes the shift winding lever 35. The biasing member 56 has a second end 56b disposed in a hole formed in the shift release lever 34. Accordingly, the shift release lever 34 and the shift winding lever 35 are biased in opposite rotational directions by the biasing member 56. The spacer member or washer 57 is configured and arranged to maintain the proper axial spacing between the shift release lever 34 and the shift winding lever 35 so that the biasing member 56 is not axially squeezed therebetween.

The shift release lever 34 is operatively coupled to the wire takeup member 47 to rotate the wire takeup member 47 in a wire releasing direction in response to movement of the shift release lever 34 from the rest position to one of the intermediate actuating positions and the fully actuating position. The shift release lever 34 includes a ring shaped mounting portion 34a, a handle portion 34b extending outwardly from the ring shaped mounting portion 34a and a stop tab 34c extending outwardly and downwardly from the ring shaped mounting portion 34a. One end of the biasing member 56 is located in a hole in the ring shaped mounting portion 34a, while the other end of the other end of the biasing member 56 contacts the tab 58a of the pushing washer 58. Thus, the biasing member 56 urges the shift release lever 34 such that the stop tab 34c is normally biased against a stationary part 70c of the shift wire position control mechanism 48 as discussed below. The peripheral edge of the ring shaped mounting portion 34a also has a stroke limiting abutment 34d that selectively contacts the control shaft 40 when the control shaft 40 is in the stroke limiting position.

The shift winding lever 35 is operatively coupled to the wire takeup member 47 to rotate the wire takeup member 47 in a wire winding direction in response to movement of the shift winding lever 35 from the rest position to one of the intermediate actuating position and the fully actuating position. The shift winding lever 35 includes a ring shaped mounting portion 35a, a handle portion 35b extending outwardly from the ring shaped mounting portion 35a and a stop tab 35c extending outwardly and downwardly from the ring shaped mounting portion 35a. The peripheral edge of the ring shaped mounting portion 35a also has a stroke limiting abutment 35d that selectively contacts the control shaft 40 when the control shaft 40 is in the stroke limiting position. The peripheral edge of the ring shaped mounting portion 35a has a notch 35e that receives a part of the shift position control mechanism 48 when the shift winding lever 35 is in the rest position.

As best seen in FIG. 12, the shift wire position control mechanism 48 of the gear shifting mechanism 33 is mounted on the pivot shaft 50 and the control mounting structure 51 of the main support member 46. The shift wire position control mechanism 48 is operated by the shift release lever 34 and the shift winding lever 35 to control the rotation of the wire takeup member 47 which selectively releases and pulls the inner wire 18a. Preferably, the shift position control mechanism 48 basically includes a shift position maintaining mechanism 62, a shift position releasing mechanism 64 and a shift position winding mechanism 66. The shift position releasing mechanism 64 is operatively coupled to the shift position maintaining mechanism 62 such that the wire takeup member 47 is rotated in the wire unwinding direction. The shift position winding mechanism 66 is operatively coupled to the shift position control mechanism 48 such that the wire takeup member 47 is rotated in the winding direction.

Preferably, as seen in FIG. 12, the shift position maintaining mechanism 62 basically includes a mounting bolt 68, a main operating lever maintaining structure 69, a mounting/control plate 70, a positioning detent structure 71 and a shift positioning member or plate 72.

The mounting bolt 68 is secured to the wall 51a of the control mounting structure 51. In particular, the mounting bolt 68 is threaded into the hole 51c of the wall 51a of the control mounting structure 51. The mounting bolt 68 secures the main operating lever maintaining structure 69, the mounting/control plate 70 and the positioning detent structure 71 to the wall 51a of the control mounting structure 51.

As seen in FIG. 12, the main operating lever maintaining structure 69 basically includes a block 69a, a compression spring 69b, and a lever engaging ball 69c. The compression spring 69b and the position retaining ball 69c are disposed in a bore of the block 69a such that the position retaining ball 69c engages the notch 35e of the winding lever 35 to hold it in its rest position.

Still referring to FIG. 12, the mounting/control plate 70 basically includes a stationary ring section 70a, a mounting arm 70b, a release lever stop tab 70c, a release pawl disengagement tab 70d, and a winding pawl disengagement tab 70e. The stationary ring section 70a is mounted around the pivot shaft 50, while the mounting arm 70*b* is secured to the wall 51*a* of the control mounting structure 51 by the mounting bolt 68. The mounting arm 70*b* of the mounting/control plate 70 also retains the positioning detent structure 71 on the wall 51*a* of the control mounting structure 51.

Figure 17:
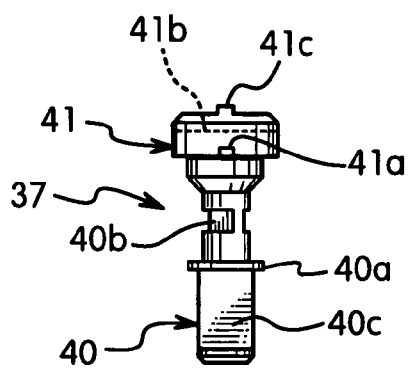
FIG. 17 is a second side elevational view of the control member of the stroke length control arrangement in accordance with the illustrated embodiment of the present invention.
Figure 18:
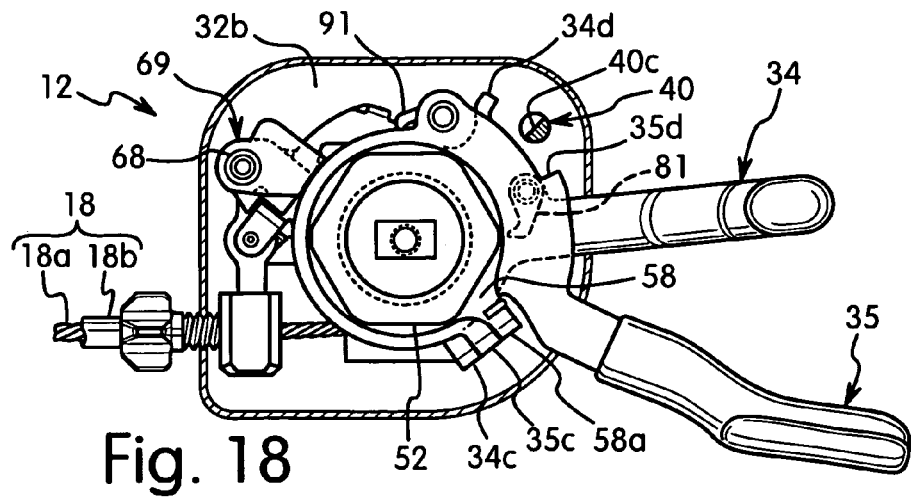
FIG. 18 is a top plan view of the gear shifting mechanism with the upper part of the housing broken away to illustrated the gear shifting mechanism in the rest position and the stroke length control arrangement in the stroke limiting position.

Still referring to FIG. 12, the positioning detent structure 71 basically includes a positioning detent member 73, a position retaining ball 74 and a compression spring 75. The detent member 73, the position retaining ball 74 and the compression spring 75 are configured and arranged to form a toggle structure such that the detent member 73 is selectively retained in two distinct engagement positions (e.g., see FIGS. 17 and 19) by the position retaining ball 74. Thus, the detent member 73 is a position maintaining member that is selectively biased in a first direction when in a first engagement position and biased in a second direction when in a second engagement position.

The rotational movement of the shift positioning member or plate 72 causes the detent member 73 to rock (toggle) back and forth against the force of the compression spring 75 on the position retaining ball 74. The detent member 73 includes a control arm 73*a* with a detent pin 73*b* and a cam arm 73*c* with a pair of cam surfaces. The detent member 73 is pivotally coupled to the wall 51*a* of the control mounting structure 51 by a pivot pin 76 that is retained between the mounting/control plate 70 and the wall 51*a* of the control mounting structure 51. The detent member 73 is selectively retained in the two distinct positions (e.g., see FIGS. 23 to 26) by the position retaining ball 74 selectively engaging the cam surfaces at the free end of the cam arm 73*c* in response to the rotational movement of the shift positioning plate 72. In particular, the detent member 73 is pivoted by the rotational movement of the shift positioning plate 72, which is rotated by the shift position releasing mechanism 64 in the wire unwinding direction and the shift position winding mechanism 66 in the winding direction. This pivotal movement of the detent member 73 causes the cam arm 73*c* to move the position retaining ball 74 against the force of the compression spring 75. As the position retaining ball 74 switches from one of the cam surfaces at the free end of the cam arm 73*c* to the other of the cam surfaces of the cam arm 73*c*, the position retaining ball 74 biases the detent member 73 from one of the two distinct positions to the other of the two distinct positions. Accordingly, the detent member 73 is toggled back and forth as the shift position control mechanism 48 from one shift position to the next shift position as seen in FIGS. 23 to 26.

As best seen in FIGS. 12 and 23 to 26, the shift positioning member or plate 72 basically includes a center opening 72*a*, a first toothed segment with a plurality of first (inner) recesses 72*b* defining a first set of the shift positions, a second toothed segment with a plurality of second (outer) recesses 72*c* defining a second set of the shift positions, and a set of winding ratchet teeth 72*d*. The first (inner) recesses 72*b* and the second (outer) recesses 72*c* constitute position retaining recesses. The shift positioning member or plate 72 also includes outwardly sloping guide ramps or surfaces 72*e* and inwardly sloping guide ramps or surfaces 72*f* that are angled towards each other in a zig-zag pattern. in other words, the guide ramps or surfaces 72*e* and 72*f* are arranged with one guide ramp being located adjacent one of the position retaining recesses 72*b* and 72*c*, respectively, to guide the detent pin 73*b* between adjacent ones of the position retaining recesses when the shift positioning plate 72 is rotated in the winding direction by operation of the main operating lever.

The center opening 72*a* is a non-circular opening that mates with the projections 47*a* of the wire takeup member 47 so that the wire takeup member 47 and the shift positioning plate 72 rotate together. In this embodiment, the first recesses 72*b* of the first toothed segment and the second recesses 72*c* of the second toothed segment are formed by a single detent retaining slot in the shift positioning plate 72. The second recesses 72*c* of the second toothed segment are spaced radially farther from the rotational axis than the first recesses 72*b* of the first toothed segment.

The shift position releasing mechanism 64 is coupled to the shift release lever 34 such that the shift release lever 34 can be used to perform a shifting operation. Preferably, as best seen in FIGS. 12 and 23 to 26, the shift position releasing mechanism 64 basically includes a cam releasing member or plate 80, a position release pawl 81, a release pawl mounting pin 82, a release pawl biasing member 83 and a retaining clip 84. The position release pawl 81 is pivotally secured to the shift release lever 34 by the release pawl mounting pin 82 and the retaining clip 84. The release pawl biasing member 83 is a torsion spring that biases the position release pawl 81 to selectively engage the cam releasing plate 80.

As seen in FIG. 12, the cam releasing plate 80 basically includes a center opening 80*a*, a first cam segment with a plurality of force applying surfaces 80*b* defining a set of first detent moving cams, a second toothed segment with a plurality of second force applying surfaces 80*c* defining a set of second detent moving cams, and a set of unwinding ratchet teeth 80*d*. The cam releasing plate 80 also includes an unwinding tab 80*e*, a winding tab 80*f* and a set of winding ratchet teeth 80*g*.

In this embodiment, the first force applying surfaces 80*b* of the first cam segment and the second force applying surfaces 80*c* of the second cam segment are formed by a single slot in the cam releasing plate 80. The second force applying surfaces 80*c* of the second cam segment are spaced radially farther from the rotational axis than the first force applying surfaces 80*b* of the first cam segment. The tabs 80*e* and 80*f* of the cam releasing plate 80 extend perpendicularly from the main plane of the cam releasing plate 80. The tabs 80*e* and 80*f* of the cam releasing plate 80 are configured and arranged to allow a limited amount of rotational play between the shift positioning plate 72 and the cam releasing plate 80. However, once the tab 80*e* or 80*f* engages the shift positioning plate 72, the shift positioning plate 72 and the cam releasing plate 80 then generally move together about the main shift axis. This limited amount of rotational play between the shift positioning plate 72 and the cam releasing plate 80 allows the first and second force applying surfaces 80*b* and 80*c* of the cam releasing plate 80 to overlap with the first and second recesses 72*b* and 72*c* of the shift positioning plate 72, respectively. In other words, limited rotational movement between the shift positioning plate 72 and the cam releasing plate 80 causes one of the first and second force applying surfaces 80*b* and 80*c* of the cam releasing plate 80 to contact the detent pin 73*b* of the detent member 73 and push the detent pin 73*b* of the detent member 73 out of one of the first and second recesses 72*b* and 72*c* of the shift positioning plate 72.

The position release pawl 81 is pivotally secured to the shift release lever 34 to selectively engage the ratchet teeth 80*d* of the cam releasing plate 80. When the shift release lever 34 is in the normal rest position, the position release pawl 81 rests on the release pawl disengagement tab 70*d* so that the position release pawl 81 is maintained out of engagement with the ratchet teeth 80*d* of the cam releasing plate 80. However, when the rider pushes the shift release lever 34 from the normal rest position in a wire unwinding direction, the release pawl biasing member 83 biases the position release pawl 81 to engage one of the ratchet teeth 80*d* of the cam releasing plate 80. Further movement of the shift release lever 34 causes the cam releasing plate 80 to rotate such that the tab 80e of the cam releasing plate 80 contacts the shift positioning plate 72. At this point, this limited rotational movement between the shift positioning plate 72 and the cam releasing plate 80 causes one of the first and second force applying surfaces 80b and 80c of the cam releasing plate 80 to contact the detent pin 73b of the detent member 73 and push the detent pin 73b of the detent member 73 out of one of the first and second recesses 72b and 72c of the shift positioning plate 72. This movement of the detent pin 73b of the detent member 73 out of one of the first and second recesses 72b and 72c of the shift positioning plate 72 causes the cam arm 73c of the detent member 73 move against the biasing force applied by the position retaining ball 74 and the compression spring 75. This pivotal movement of the detent member 73 causes the cam arm 73c to ride along the position retaining ball 74 such that the force of the position retaining ball 74 and the compression spring 75 on the cam arm 73c switches from one of the cam surfaces of the cam arm 73c to the other of the cam surfaces of the cam arm 73c. Accordingly, the detent member 73 is forcibly moved from one shift position to the next shift position. This arrangement allows the shift release lever 34 to be operated in a wire release (unwinding) direction to shift at least two adjacent ones of the predetermined shift positions in a single continuous shift operation if the control member 37 is in the non-stroke limiting position. Preferably the shift release lever 34 preferably has a range of movement that allows the rider to selectively shift one, two and three shift positions in a single continuous shift operation. In other words, the shift positioning plate 72 and the cam releasing plate 80 are configured and arranged to move together such that the detent member 73 toggles between adjacent ones of the first and second recesses 72b and 72c of the shift positioning plate 72 to allow the rider to shift one, two or three shift positions in a single continuous shift operation depending on the movement of the shift release lever 34.

As best seen in FIG. 12, the shift position winding mechanism 66 basically includes the ratchet teeth 72d of the shift positioning plate 72, a position winding pawl 91, a winding pawl mounting pin 92, a winding pawl biasing member 93 and a retaining clip 94. The position winding pawl 91 is pivotally secured to the shift winding lever 35 by the winding pawl mounting pin 92 and the retaining clip 94. The winding pawl biasing member 93 is a torsion spring that biases the position winding pawl 91 to selectively engage the ratchet teeth 72d of the shift positioning plate 72.

When the shift winding lever 35 is in the normal rest position, the position winding pawl 91 rests on the winding pawl disengagement tab 70e so that the position winding pawl 91 is maintained out of engagement with the ratchet teeth 72d of the shift positioning plate 72. However, when the rider pushes the shift winding lever 35 from the normal rest position in a wire winding direction, the winding pawl biasing member 93 biases the position winding pawl 91 to engage one of the ratchet teeth 72d of the shift positioning plate 72 and one of the ratchet teeth 80g of the cam releasing plate 80. Further movement of the shift winding lever 35 causes the shift positioning plate 72 and the cam releasing plate 80 to rotate together. At this point, the shift positioning plate 72 and the cam releasing plate 80 rotate together such that the detent pin 73b of the detent member 73 rides out of one of the first and second recesses 72b and 72c of the shift positioning plate 72 along one of the guide surfaces 72e or 72f of the shift positioning plate 72. This movement of the detent pin 73b of the detent member 73 out of one of the first and second recesses 72b and 72c of the shift positioning plate 72 causes the cam arm 73c of the detent member 73 to move against the biasing force applied by the position retaining ball 74 and the compression spring 75. This pivotal movement of the detent member 73 causes the cam arm 73c to ride along the position retaining ball 74 such that the biasing force of the position retaining ball 74 and the compression spring 75 switches from one of the cam surfaces at the free end of the cam arm 73c to the other of the cam surfaces of the cam arm 73c. Accordingly, the detent member 73 is forcibly moved from one shift position to the next shift position as seen in FIGS. 23 to 26.

General Interpretation of Terms

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control device comprising:
  a shifter housing;
  a gear shifting mechanism disposed in the shifter housing with the gear shifting mechanism having a plurality of gear positions;
  a shift operating member operatively coupled to the gear shifting mechanism, the shift operating member being movable between a rest position and a fully actuating position; and
  a stroke length control arrangement configured and arranged to selectively limit movement of the shift operating member in a range of movement between the rest position and an intermediate actuating position by preventing the shift operating member from being moved past the intermediate actuating position to the fully actuating position.

2. The bicycle shift control device according to claim 1, wherein the shift operating member operatively coupled to the gear shifting mechanism to selectively operate the gear shifting mechanism such that a single gear shifting occurs in a single progressive gear shifting movement of the shift operating member between the rest position and the intermediate actuating position and such that a multiple gear shifting occurs in a single progressive gear shifting movement of the shift operating member between the rest position and the fully actuating position.

3. The bicycle shift control device according to claim 2, wherein
the stroke length control arrangement includes a control member that is configured and arranged to limit movement of the shift operating member to a single gear shifting movement when the control member is in a stroke limiting position, and to permit movement of the shift operating member to a multiple gear shifting movement when the control member is in a stroke non-limiting position.

4. The bicycle shift control device according to claim 3, wherein
the control member includes a shaft with a cutout that is configured and arranged such that the shift operating member is movable from the rest position past the intermediate actuating position to the fully actuating position when the control member is in the stroke non-limiting position.

5. The bicycle shift control device according to claim 1, wherein
the gear shifting mechanism includes a mechanical arrangement that includes a wire takeup member operatively coupled to the shift operating member.

6. The bicycle shift control device according to claim 5, wherein
the wire takeup member is pivotally mounted within the shifter housing.

7. The bicycle shift control device according to claim 5, wherein
the shift operating member is a release lever that is operatively coupled to the wire takeup member to rotate the wire takeup member in a wire releasing direction in response to movement of the release lever from the rest position to one of the intermediate actuating position and the fully actuating position.

8. The bicycle shift control device according to claim 5, wherein
the shift operating member is a winding lever that is operatively coupled to the wire takeup member to rotate the wire takeup member in a wire winding direction in response to movement of the winding lever from the rest position to one of the intermediate actuating position and the fully actuating position.

9. The bicycle shift control device according to claim 1, wherein
the shift operating member is a lever that is pivotally mounted to the shifter housing.

10. The bicycle shift control device according to claim 1, wherein
the stroke length control arrangement includes a control member that is configured to be selectively moved by a user between a stroke non-limiting position that allows the shift operating member to be moved from the rest position past the intermediate actuating position to the fully actuating position and a stroke limiting position that restricts the shift operating member from being moved past the intermediate actuating position.

11. The bicycle shift control device according to claim 10, wherein
the control member is configured and arranged such that a part of the control member is located in a shifting path of the shift operating member to directly contact a part of the shift operating member when the control member is in the stroke limiting position and the shift operating member is moved to the intermediate actuating position, the control member being moved between the stroke non-limiting position and the stroke limiting position while remaining disposed in the shifter housing.

12. The bicycle shift control device according to claim 1, wherein
the stroke length control arrangement includes a control shaft with a cutout that is configured and arranged such that the shift operating member is movable from the rest position past the intermediate actuating position to the fully actuating position when the control shaft is in a stroke non-limiting position.

13. The bicycle shift control device according to claim 1, wherein
the stroke length control arrangement includes a user operable part that is accessible through the shifter housing without disassembling the bicycle shift control device.

14. The bicycle shift control device according to claim 13, wherein
the stroke length control arrangement further includes a control shaft that is attached to the user operable part such that the control shaft is rotated in response to rotational movement of the user operable part.

15. The bicycle shift control device according to claim 1, wherein
the stroke length control arrangement is disposed within the shifter housing and is further arranged to be selectively moved by a user between a stroke non-limiting position that allows the shift operating member to be moved from the rest position past the intermediate actuating position to the fully actuating position and a stroke limiting position that restricts the shift operating member from being moved past the intermediate actuating position, the stroke length control arrangement being moved between the stroke non-limiting position and the stroke limiting position while remaining disposed in the shifter housing.

* * * * *